US 6,731,674 B1

(12) United States Patent
Yang et al.

(10) Patent No.: US 6,731,674 B1
(45) Date of Patent: May 4, 2004

(54) DEVICE AND METHOD FOR GENERATING QUASI-ORTHOGONAL CODE AND SPREADING CHANNEL SIGNALS IN MOBILE COMMUNICATION SYSTEM

(75) Inventors: Kyeong-Cheol Yang, Seoul (KR); Jae-Yoel Kim, Kunpo-shi (KR); Hee-Won Kang, Seoul (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/405,333

(22) Filed: Sep. 24, 1999

(30) Foreign Application Priority Data

Sep. 25, 1998 (KR) .............................. 98/40408

(51) Int. Cl.[7] .......................... H04B 15/00; H04K 1/00; H04L 27/30
(52) U.S. Cl. ..................... 375/146; 375/141; 370/335
(58) Field of Search ................. 375/140, 141, 375/146; 370/203, 208, 209, 335, 342, 341

(56) References Cited

U.S. PATENT DOCUMENTS

| 3,715,508 A | * | 2/1973 | Blasbalg ............... 370/203 |
| 5,103,459 A | | 4/1992 | Gilhousen et al. |
| 5,103,459 A | | 7/1999 | Gilhousen et al. |
| 6,157,611 A | * | 12/2000 | Shanbhag .............. 370/208 |
| 6,240,143 B1 | * | 5/2001 | Shanbhag .............. 375/295 |
| 6,314,125 B1 | * | 11/2001 | Shanbhag .............. 375/130 |

OTHER PUBLICATIONS

A.R. Hamons, P.V. Kumar, A.R. Calderbank, N.J.A. Sloane, and P. Sole, "The Z4–linearity of Kerdock, Preparata, Goethals and Related Codes", IEEE Trans. Inform. Theory, vol. IT–40, pp. 301–319, Mar., 1994.

* cited by examiner

Primary Examiner—Phoung Phu
(74) Attorney, Agent, or Firm—Dilworth & Barrese LLP

(57) ABSTRACT

A device and method for generating a binary quasi-orthogonal code in a CDMA communication system. The method comprises generating an m-sequence, and specific left and right sequences having a good full correlation property with the m-sequence; column permuting the specific left and right sequences in a column permutation method used when converting the m-sequence to a Walsh orthogonal code, and connecting the left sequences to the right sequences to generate mask candidates; operating the mask candidates and Walsh orthogonal codes having the same length as the mask candidates to generate quasi-orthogonal code candidate families; and selecting a quasi-orthogonal code out of the generated quasi-orthogonal code candidate families, the selected quasi-orthogonal code satisfying a partial correlation property with the Walsh orthogonal codes, and selecting a mask related to generation of the selected quasi-orthogonal code.

9 Claims, 13 Drawing Sheets

$$Q = \begin{bmatrix} 0 & 0 & 0 & 0 & 0 & 0 & \ldots & 0 & 0 \\ 0 & & & S_0(t) & & & & & \\ 0 & & & S_0(t+1) & & & & & \\ 0 & & & S_0(t+2) & & & & & \\ \vdots & & & \vdots & & & & & \\ 0 & & & S_0(t+2^m-2) & & & & & \\ 0 & & & S_1(t) & & & & & \\ 0 & & & S_1(t+1) & & & & & \\ \vdots & & & \vdots & & & & & \\ 0 & & & S_1(t+2^m-2) & & & & & \\ 0 & & & S_2(t) & & & & & \\ 0 & & & S_2(t+1) & & & & & \\ \vdots & & & \vdots & & & & & \\ 0 & & & S_{2^m-1}(t) & & & & & \\ 0 & & & S_{2^m-1}(t+1) & & & & & \\ \vdots & & & \vdots & & & & & \\ 0 & & & S_{2^m-1}(t+2^m-2) & & & & & \end{bmatrix}$$

FIG.3

$$Q = \begin{bmatrix} \overset{\overset{2^m}{\overline{W}}}{e_0 + W} \\ e_1 + W \\ \\ e_{2^m-1} + W \end{bmatrix} 2^m \times 2^m$$

FIG.4

$$QOF_1 = W_1$$

$$\vdots$$

$$QOF_{2^m} = W_{2^m}$$

$$QOF_{2^m+1} = e_1 + W_1$$

$$\vdots$$

$$QOF_{2^{m+1}} = e_1 + W_{2^m}$$

$$\vdots$$

$$QOF_{2^{m+N}+1} = e_N + W_1$$

$$\vdots$$

$$QOF_{2^{m+N+1}} = e_N + W_{2^m}$$

FIG.11

DEVICE AND METHOD FOR GENERATING QUASI-ORTHOGONAL CODE AND SPREADING CHANNEL SIGNALS IN MOBILE COMMUNICATION SYSTEM

BACKGROUND OF THE INVENTION

1. Field of the Invention

The present invention relates generally to a channel communication device and a method used in a CDMA communication system, and in particular, to a device and method for generating binary quasi-orthogonal codes and spreading channel signals using the generated binary quasi-orthogonal codes.

2. Description of the Related Art

In general, a CDMA (Code Division Multiple Access) mobile communication system performs channel separation using orthogonal codes in order to increase channel capacity. Walsh orthogonal codes are typically used for the orthogonal codes. For example, a forward link specified by the IS-95/IS-95A standard separates the channels using the Walsh orthogonal codes.

FIG. 1 illustrates the IS-95/IS-95A forward link in which channels are separated by Walsh orthogonal codes. Referring to FIG. 1, channels are separated by unique Walsh orthogonal codes Wi (where i=0 to 63), respectively. The IS-95/IS-95A forward link uses a coding rate R=½ convolutional codes for channel coding, employs BPSK (Binary Phase Shift Keying) modulation for spreading the Walsh orthogonal codes, and has a bandwidth of 1.2288 MHz. Accordingly, the number of available channels is 1.2288 MHz/(9.6 KHz*2)=64. That is, the IS-95/IS-95A forward link can separate 64 channels using the Walsh orthogonal codes.

Therefore, the number of available Walsh orthogonal codes is dependent on the employed modulation method and the minimum data rate. However, future CDMA mobile communication systems will require a greater number of channels assigned to users in order to improve performance. To this end, future CDMA mobile communication systems will employ traffic channels, pilot channels and control channels, thereby increasing channel capacity.

However, there are a limited number of available orthogonal codes available for use. This limitation will restrict the increase in channel capacity. To overcome this disadvantage, it is desirable to generate quasi-orthogonal codes, which will limit interference with the orthogonal codes and a variable data rate.

SUMMARY OF THE INVENTION

It is, therefore, an object of the present invention to provide a device and method for generating quasi-orthogonal codes which have the least interference with Walsh orthogonal codes in a CDMA communication system using the Walsh orthogonal codes to perform channel spreading.

It is another object of the present invention to provide a device and method for generating binary quasi-orthogonal codes having excellent full correlation and partial correlation with Walsh orthogonal codes in a CDMA communication system.

It is further another object of the present invention to provide a device and method for spreading channel signals using quasi-orthogonal codes limiting interference with orthogonal codes in a CDMA communication system.

It is still another object of the present invention to provide a channel transmission device and method for spreading channel signals selectively using Walsh orthogonal codes and binary quasi-orthogonal codes in a CDMA communication system.

To achieve the above objects, there is provided a method for generating a binary quasi-orthogonal code in a CDMA communication system. The method comprises generating an m-sequence, and specific left and right sequences having a good full correlation property with the m-sequence; column permuting the specific left and right sequences in a column permutation method used when converting the m-sequence to a Walsh orthogonal code, and connecting the left sequences to the right sequences to generate mask candidates; operating the mask candidates and Walsh orthogonal codes having the same length as the mask candidates to generate quasi-orthogonal code candidate families; and selecting a quasi-orthogonal code out of the generated quasi-orthogonal code candidate families, the selected quasi-orthogonal code satisfying a partial correlation property with the Walsh orthogonal codes, and selecting a mask related to generation of the selected quasi-orthogonal code.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a matrix Q for shifted sequences according to an embodiment of the present invention;

FIG. 4 is a diagram illustrating a matrix Q' for quasi-orthogonal code candidates added to Walsh orthogonal codes after performing column permutation for the matrix Q of FIG. 3 according to an embodiment of the present invention;

Figure 8:
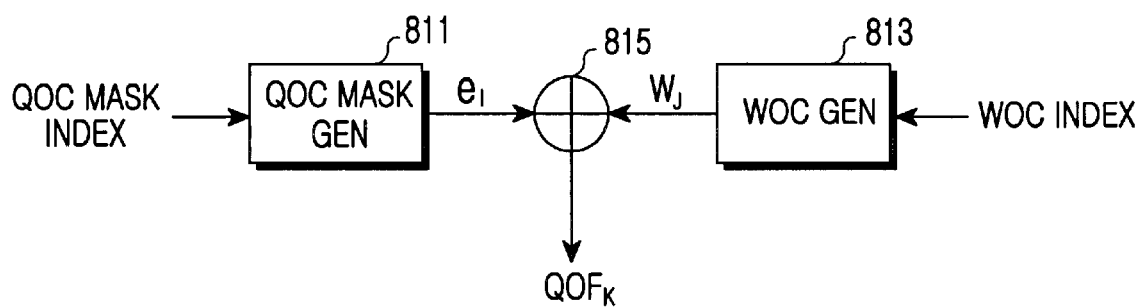
FIG. 8 is a block diagram illustrating a quasi-orthogonal code generator for the channel transmitter of FIG. 7 according to an embodiment of the present invention in a CDMA communication system.
Figure 12:
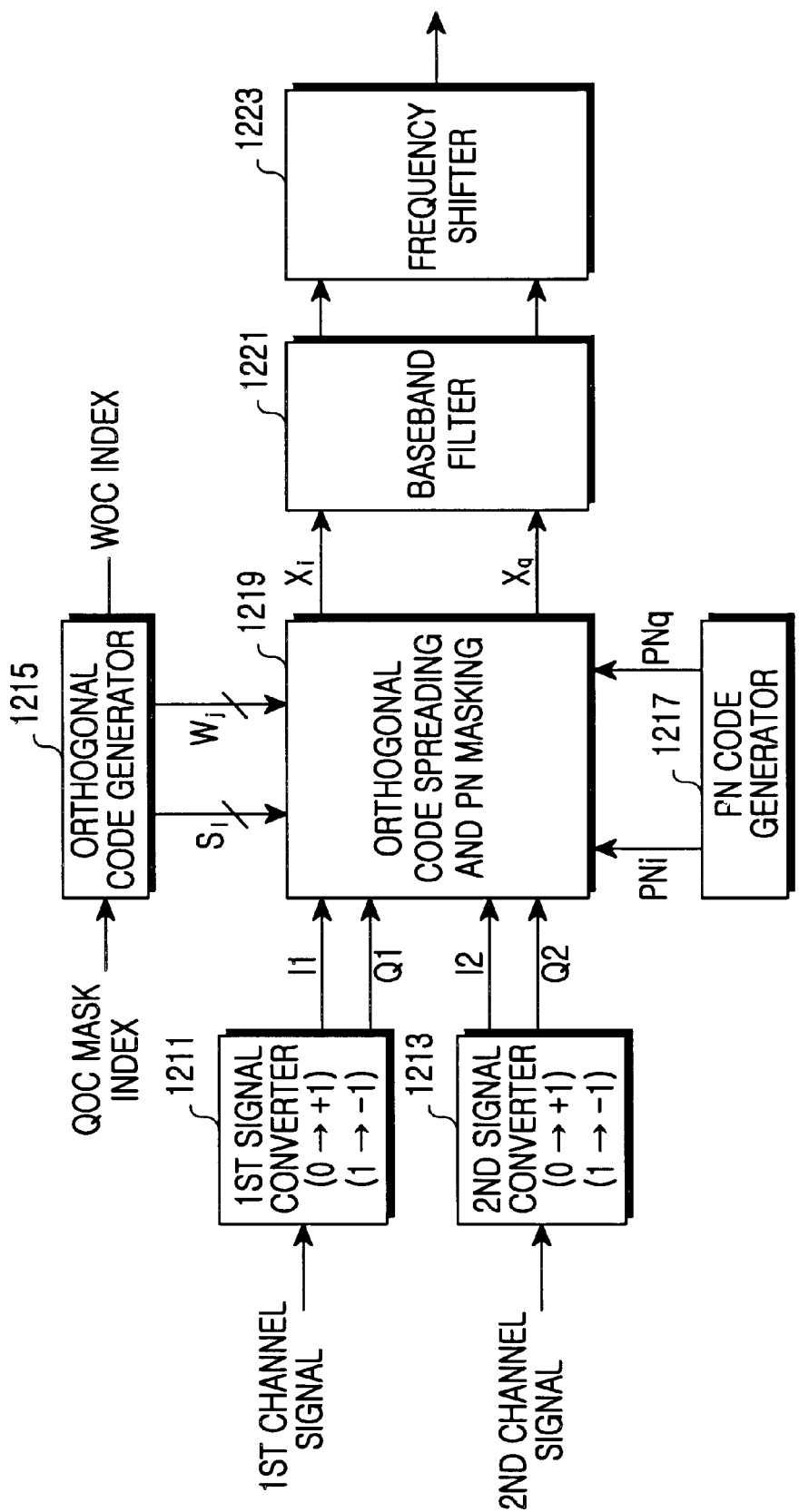
Figure 13:
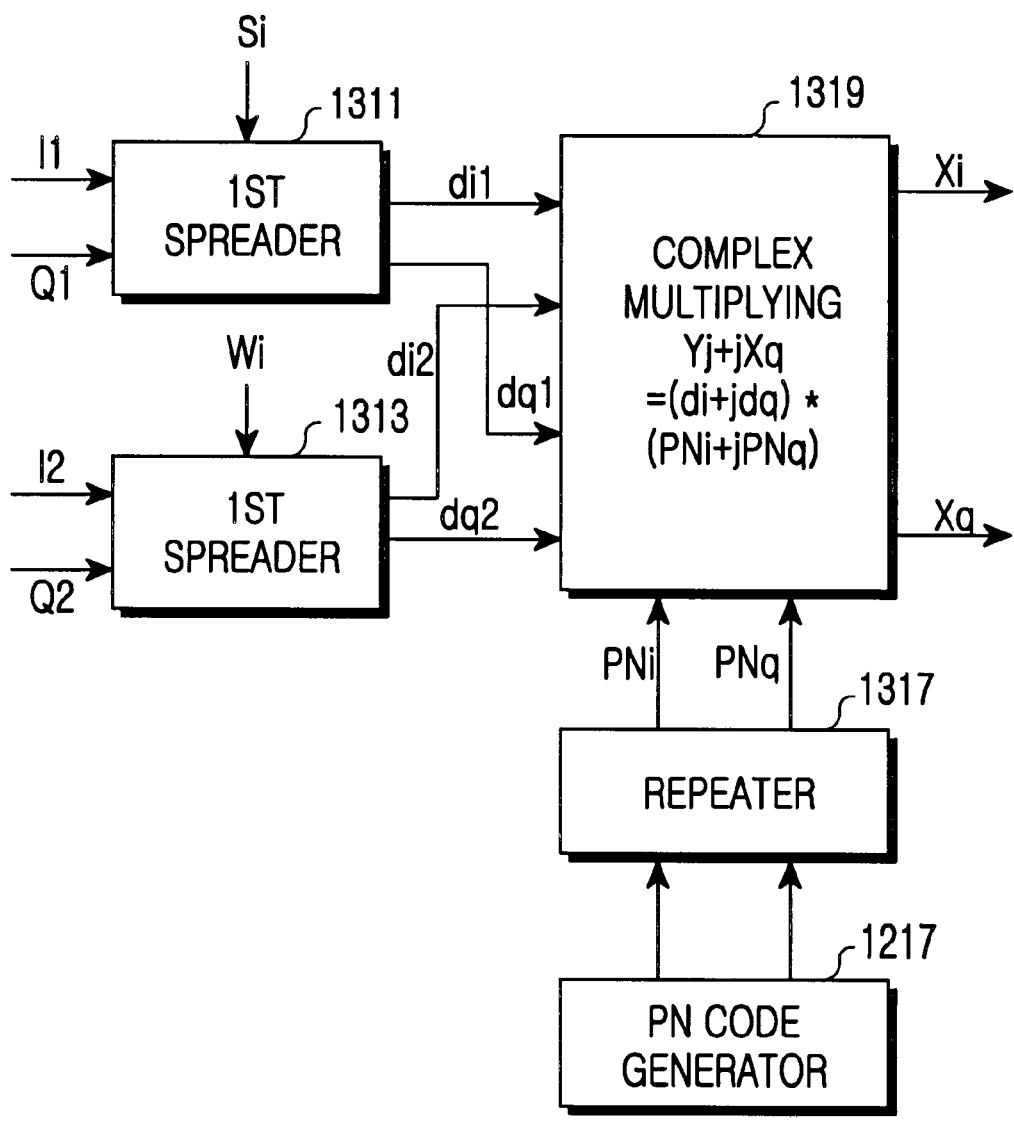
Figure 14:
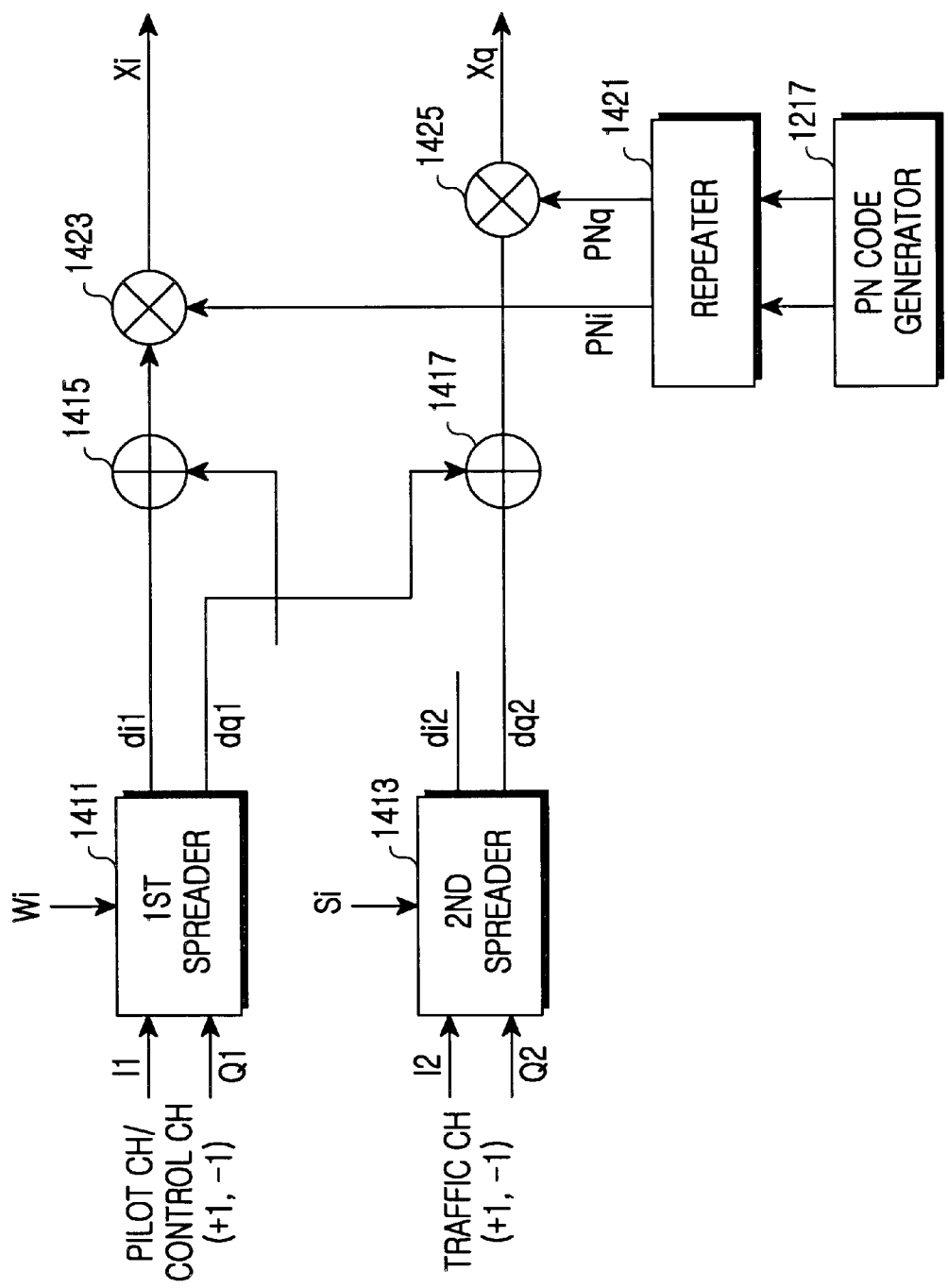

FIG. 11 is a diagram illustrating a table for generating quasi-orthogonal codes in the quasi-orthogonal code generator of FIG. 8 according to another embodiment of the present invention;

FIG. 12 is a block diagram illustrating a channel transmitter for spreading channel signals using quasi-orthogonal codes and Walsh orthogonal codes in a CDMA communication system;

FIG. 13 is a detailed block diagram illustrating a scheme for spreading channel signals transmitted using quasi-orthogonal codes in FIG. 12; and FIG. 14 is a detailed block diagram illustrating a scheme for spreading channel signals transmitted using quasi-orthogonal codes and Walsh orthogonal codes in FIG. 12.

DETAILED DESCRIPTION OF THE PREFERRED EMBODIMENT

A preferred embodiment of the present invention will be described herein below with reference to the accompanying drawings. In the following description, well-known functions or constructions are not described in detail to avoid obscuring the invention in unnecessary detail.

The present invention generates quasi-orthogonal codes, which will have limited interference with orthogonal codes, in order to increase the channel capacity or maximize a capacity of a single cell in a CDMA communication system.

Binary quasi-orthogonal codes should satisfy the following Equations:

$$\left| \sum_{t=1}^{N} (-1)^{S_i(t)+W_k(t)} \right| \leq \theta_{min}(N) \quad \ldots (1) \quad \text{<Equation 1>}$$

$$\left| \sum_{t=1}^{N} (-1)^{S_i(t)+S_{i'}(t)} \right| \leq \theta_{min}(N) \quad \ldots (2) \quad \text{<Equation 2>}$$

$$\left| \sum_{t=1+(\frac{N}{M}l)}^{\frac{N}{M}(l+1)} (-1)^{S_i(t)+W_k(t)} \right| \leq \theta_{min}\left(\frac{N}{M}\right) \quad \ldots (3) \quad \text{<Equation 3>}$$

where i=0,1,2, . . . ,log$_2$ M−1.

In Equations (1) to (3), $W_k(t)$ denotes the k-th sequence of a Walsh orthogonal code having length N (1≦k≦N) and $S_i(t)$ denotes an i-th quasi-orthogonal code having length N (1≦i≦X), where X denotes the number of quasi-orthogonal codes satisfying Conditions 1 to 3. Condition 1 expressed by Equation (1) means that the full correlation between the k-th Walsh orthogonal code $W_k(t)$ (1≦k≦N, 1≦t≦N) and the i-th quasi-orthogonal code $S_i(t)$ (1≦i≦X, 1≦t≦N) should not exceed $\theta_{min}(N)$. Condition 2 expressed by Equation (2) means that the full correlation between an i-th line and an i'-th line of a quasi-orthogonal code should not exceed $\theta_{min}(N)$. Condition 3 expressed by Equation (3) means that a partial correlation should not exceed $$\theta_{min}\left(\frac{N}{M}\right),$$

when the partial correlation is taken for respective parts $$\frac{N}{M}$$

obtained by dividing, by M, the length N of a k-th line of an Walsh orthogonal code and an i-th line of a quasi-orthogonal code.

Figure 1:
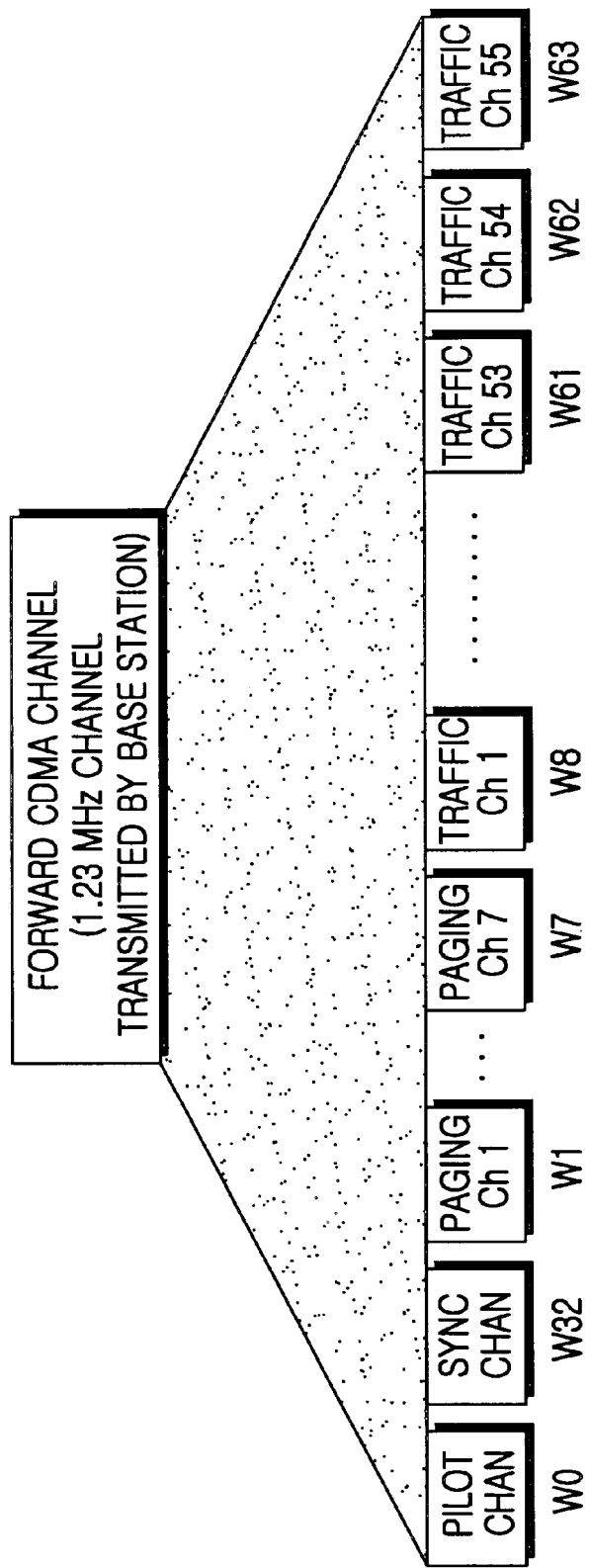
FIG. 1 is a diagram illustrating channel separation using Walsh orthogonal codes in a conventional CDMA communication system.
Figure 2:
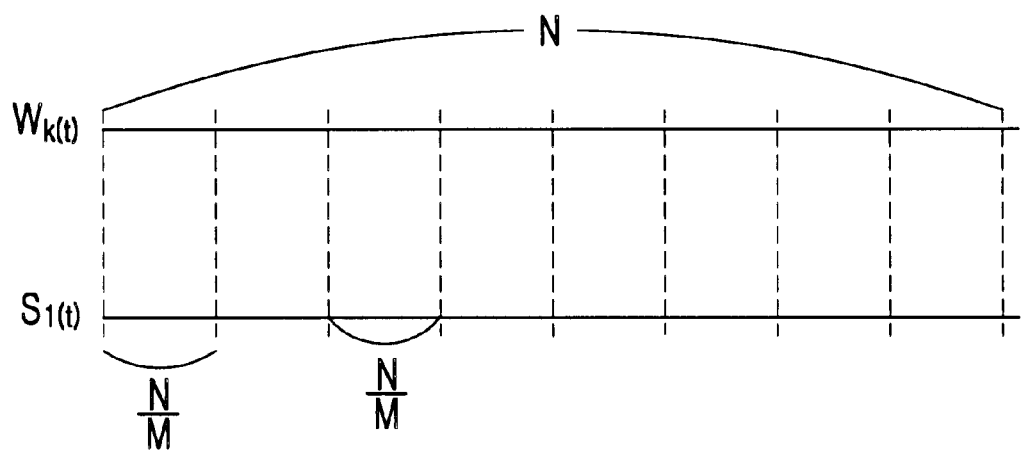
FIG. 2 is a diagram illustrating a partial correlation property between a Walsh orthogonal code and a quasi-orthogonal code, satisfying Condition 3 according to an embodiment of the present invention.

Here, Condition 1 of Equation (1) represents the full correlation property of a Walsh orthogonal code and a quasi-orthogonal code, and means the minimum correlation value that a quasi-orthogonal code can have theoretically as an absolute correlation value with a Walsh orthogonal code, wherein $\theta_{min}(N)=\sqrt{N}$. Condition 2 of Equation (2) represents a condition for a full correlation property between quasi-orthogonal codes. Condition 3 of Equation (3) represents a partial correlation property between a Walsh orthogonal code and a quasi-orthogonal code, as shown in FIG. 2. In FIG. 2, M=$2^m$ (0≦m≦log$_2$N). The partial correlation of Equation 3, shown in FIG. 2, satisfies a correlation property for the case where the N/M parts of the orthogonal code are transmitted while the data rate increases during a data service. This partial correlation satisfies a correlation property at this moment. For example, when N=256, $$\theta_{min}\left(\frac{N}{M}\right)$$

values are shown in Table 1.

TABLE 1

| | | |
|---|---|---|
| N = 256 | M = 1 | $\theta_{min}(N) = 16$ |
| N = 256 | M = 2 | $\theta_{min}\left(\frac{N}{M}\right) = 16$ |
| N = 256 | M = 4 | $\theta_{min}\left(\frac{N}{M}\right) = 8$ |
| N = 256 | M = 8 | $\theta_{min}\left(\frac{N}{M}\right) = 8$ |
| N = 256 | M = 16 | $\theta_{min}\left(\frac{N}{M}\right) = 4$ |
| N = 256 | M = 32 | $\theta_{min}\left(\frac{N}{M}\right) = 4$ |
| N = 256 | M = 64 | $\theta_{min}\left(\frac{N}{M}\right) = 2$ |

The results of Table 1 can be generally extended. For example, when N=1024 and M=2, for the partial correlation during length 512 out of an orthogonal code of length 1024, a full correlation bound $\theta_{min}(N)$ between an orthogonal code of length 512 and a sequence other than the orthogonal code should be considered. Table 2 shows the relationship between the length N and the minimum correlation value $\theta_{min}(N)$.

TABLE 2

| | |
|---|---|
| N = 2048 | $\theta_{min}$ (N) = 64 |
| N = 1024 | $\theta_{min}$ (N) = 32 |
| N = 512  | $\theta_{min}$ (N) = 32 |
| N = 256  | $\theta_{min}$ (N) = 16 |
| N = 128  | $\theta_{min}$ (N) = 16 |

TABLE 2-continued

| | |
|---|---|
| N = 64 | $\theta_{min}$ (N) = 8 |
| N = 32 | $\theta_{min}$ (N) = 8 |

Active research has been carried out regarding the sequences satisfying Conditions 1 and 2. For these sequences, there are known Kasami sequences of length $2^{2m}$ and Gold sequences of length $2^{2m+1}$. That is, both the Kasami sequence family and Gold sequence family have a good cross correlation property. A full correlation property for the above sequence families is well known.

No research has been conducted with regard to providing a sequence satisfying Condition 3. However, it is very important for the IS-95B standard or the future CDMA system supporting the variable data rate to satisfy Condition 3.

In an embodiment of the present invention, Kerdock code families are generated as Family A sequences so as to generate binary quasi-orthogonal code families having the increased number of code families satisfying the above conditions.

First, a reference will be made to a method for generating Kerdock codes. For formation, see A. R. Hammons, P. V. Kumar, A. R. Calderbank, N. J. A. Sloane, and P. Sole, "The Z4-linearity of Kerdock, Preparata, Goethals and related codes,", IEEE Trans. Inform. Theory, vol.IT-40, pp. 301–319, Mar., 1994.

A binary Kerdock code of length $2^m-2$ is expressed as the sum of a sequence of length $2^m-2$ generated by repeating twice an m-sequence of length $2^{m-1}-1$, and a specific sequence of length $2^m-2$, wherein the specific sequence is generated by arranging left and right sequences each having length $2^{m-1}-1$. First, a binary primitive polynomial f(x) of the (m-1)-th degree is selected to obtain a quasi-orthogonal code sequence of length $2^m$. It is possible to construct a Galois Field $GF(2^{m-1})$ using the characteristic polynomial f(x). When a root of the characteristic polynomial f(x) is represented by β, Kerdock codeword can be expressed as Equation (4) below by using a trace function in the Galois Field $GF(2^{m-1})$.

<Equation 4>

$$c(t,x_1) = Q_\gamma(t,x_1) + L_{\eta,c_0,c_1}(t,x_1) \quad (4)$$

where, $Q_\gamma(t,x_1) = \sigma_2(\gamma\alpha^1) + x_1\sigma_1(\gamma\alpha^1)$,
$L_{\eta,c_0,c_1}(t,x_1) = \sigma_1(\eta\beta^t) + c_0 x_1 + c_1$,
$\eta,\gamma \in \{0,1,\beta,\beta^2,\beta^3,\ldots,\beta^{2^{m-1}-2}\}$,
$c_0,c_1,x_1 \in GF(2)$, $$\sigma_1(x) = T\gamma_{m-1}(x) = \sum_{S=0}^{m-2} x^{2^S}, \text{ and } \sigma_2(x) = \sum_{S=0}^{(m-2)/2} T\gamma_{m-1}(x^{1+2^S}).$$

In Equation (4), $\sigma_1(\eta\beta^t)$ is an m-sequence of length $2^{m-1}-1$, and a Walsh orthogonal code of length $2^{m-1}$ having symbols of "0" and "1" can be obtained by substituting "0" or $\beta^t$ ($0 \leq i \leq 2^{2^{m-1}-2}$) for η and then column permuting it.

Figure 9:
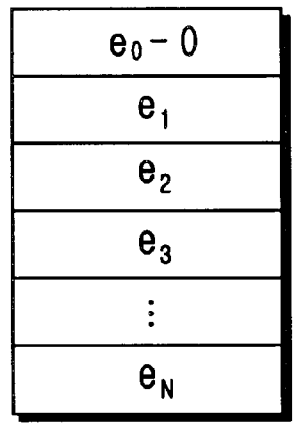
FIG. 9 is a diagram illustrating a quasi-orthogonal code mask table in the quasi-orthogonal code generator of FIG. 8 according to an embodiment of the present invention, by way of example.

Further, in Equation (4), $x_1$ has a value of "0" and "1", and it is possible to obtain $(2^{m-1}-1)$ sequences of length $2^{m-1}$ by inserting "0" at the head of the sequence $Q_\gamma(t,x_1)$ of length $2^{m-1}-1$ for the respective $x_1$ and then substituting $\beta^t$ ($0 \leq i \leq 2^{2^{m-1}}-2$) for γ. At this point, sequences of length $2^m-2$ simultaneously satisfying Conditions 1 and 2 are generated by arranging left sequences of length $2^{m-1}-1$ generated for $x_1=0$ and right sequences of length $2^{m-1}-1$ generated for $x_1=1$, as shown in FIG. 9; there exist $(2^{m-1}-1)$ sequences of length $2^m-2$. Therefore, the sequences of length $2^m-2$ are called mask candidates, and a mask candidate value of the sequence family for $\gamma=\beta^t$ will be expressed as Si(t), as shown in Equation (7) below.

<Equation 5>

$$K = [S_0(t), S_1(t), \ldots, S_{2^{m-1}-2}(t)] \quad (5)$$

where $t = 0, 1, 2, \ldots, 2^m-3$.

It is possible to crease a matrix Q of FIG. 3 by inserting "0" at the head of each sequence in the set K of Equation (5). The matrix Q has $(2^{m-1}-1)*2^m$ rows and $2^m$ columns. Here, through column permutation, there are generated orthogonal codes of length $2^m$ and $(2^{m-1}-1)$ sequences satisfying Conditions 1 and 2; and it is possible to obtain $(2^{m-1}-1)*2^m$ quasi-orthogonal code candidates satisfying Conditions 1 and 2 by combining the above sequences as masks with Walsh orthogonal codes. Next, sequences satisfying Condition 3 will be extracted from the $(2^{m-1}-1)*2^m$ sequences.

Figure 5:
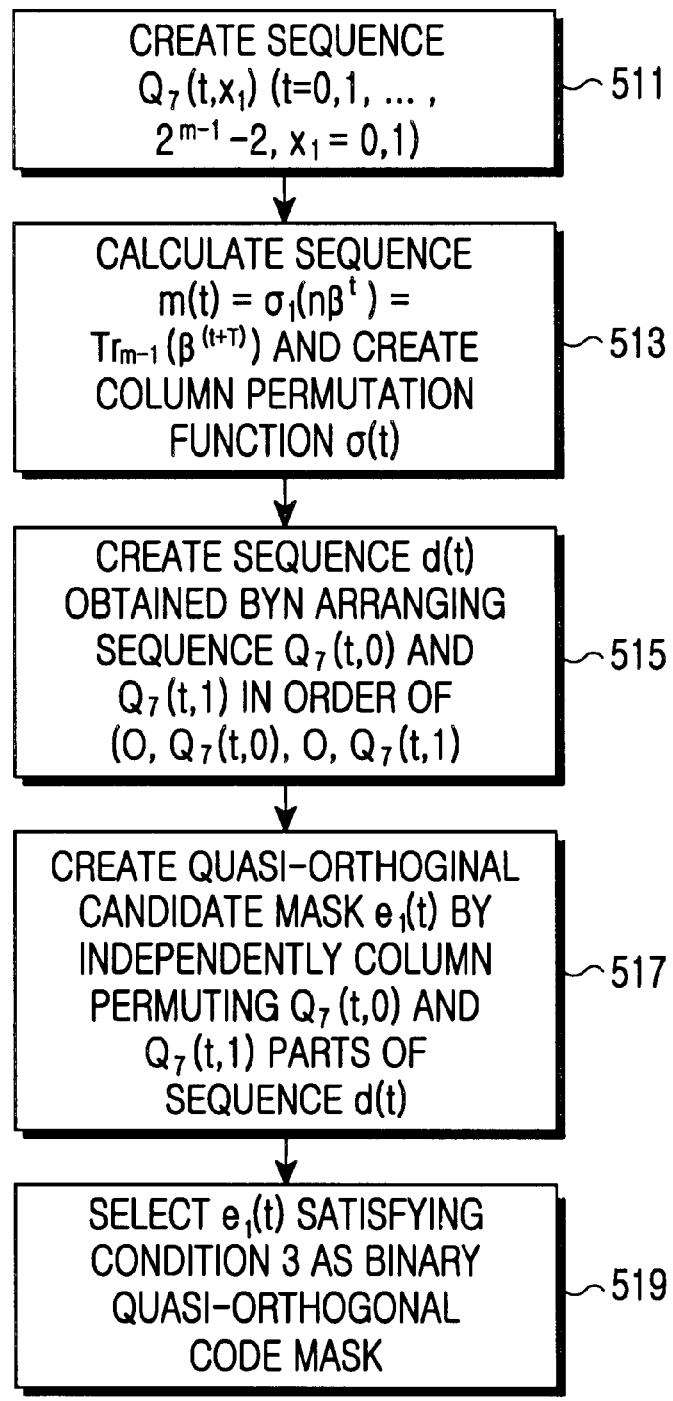
FIG. 5 is a flow chart illustrating a procedure for generating binary quasi-orthogonal codes according to a first embodiment of the present invention.

FIG. 5 illustrates a procedure for generating quasi-orthogonal candidate sequences of length $2^m$.

Referring to FIG. 5, in step 511, sequences, $Q_\gamma(t,x_1)$, $t=0,1,\ldots,2^{m-1}-2$, $x_1=0,1$, of length $2^{m-1}-1$ for the respective $x_1$, i.e., the left sequences and the right sequences are generated.

In step 513, let $m(t) = \sigma_1(\eta\beta^t) = T\gamma_{m-1}(\beta^{(t+\tau)})$, when $\eta=\beta^\tau$. By doing so, a column permutation function σ for a binary sequence can be defined as:

$$\sigma: \{0, 1, 2, \ldots, 2^{m-1}-2\} \to \{1, 2, \ldots 2^{m-1}-1\} \quad [\text{Equation 6}]$$

$$\sigma(t) = \sum_{i=0}^{m-2} m(t+i) 2^{m-2-i}$$

Thereafter, in step 515, "0" is inserted at the head of each partial sequence of length $2^{m-1}-1$ generated in step 511 to increase the length to $2^{m-1}$ and then, for each t, a sequence of length $2^m$ is created by arranging a partial sequence of length $2^{m-1}$ for $x_1=0$ and successively arranging a partial sequences of length $2^{m-1}$ for $x_1=1$. This can be defined as:

$$[d_i(t) | t = 1, \ldots, 2^m, \quad i = 1, 2, \ldots, 2^{m-1}-1] \quad [\text{Equation 7}]$$

$$d_i(t) = \begin{cases} 0, & \text{if } t = 1 \\ S(t+i-3), & \text{if } t = 2, 3, \ldots, 2^{m-1} \\ 0, & \text{if } t = 2^{m-1}+1 \\ S(t+i-4), & \text{if } t = 2^{m-1}+2, 2^{m-1}+3, \ldots 2^m \end{cases}$$

Then, in step 517, the leading $2^{m-1}$ part and the following $2^{m-1}$ part of the sequence generated in step 515 are independently column permuted by the column permutation function generated in step 513. That is, in step 517, new sequences are generated, which can be defined as:

[Equation 8]

$$[e_i(t) | t = 1, \ldots, 2^m, \quad i = 1, 2, \ldots, 2^{m-1}-1]$$

$$e_i(t) = \begin{cases} d_i(t), & \text{if } t = 1 \\ d_i(\sigma^{-1}(t-1)+2), & \text{if } t = 2, 3, \ldots, 2^{m-1} \\ d_i(t), & \text{if } t = 2^{m-1} \\ d_i(\sigma^{-1}(t-1-2^{m-1})+2+2^{m-1}), & \text{if } t = 2^{m-1}+2, 2^{m-1}+3, \ldots, 2^m \end{cases}$$

Thereafter, in step 519, quasi-orthogonal codes are arranged as shown in FIG. 4 using the sequences generated in the above process, in accordance with Equation (9) below.

$$[S_{ij}(t)|t=1,2,\ldots,2^m]S_{ij}(t)=e_i(t)+W_j(t)(\bmod 2), i=0,1,2,\ldots, 2^{m-1}-2, j=0,1,\ldots,2^m-1 \quad \text{[Equation 9]}$$

At this point, $[W_j(t)|t=1,2,\ldots,2^m, j=0,1,\ldots,2^m-1]$ represents a Walsh sequence, being an orthogonal code, which is expressed with symbols of "0" and "1".

A detailed description will be now made regarding the procedure for generating binary quasi-orthogonal code masks with reference to FIG. 5, by way of example.

Herein, it is assumed that $f(x)=x^3+x+1$ is used for the binary primitive polynomial. Accordingly, in step 511, let the root of $g(x)$ be $\beta$ to determine specific sequences. That is, $\beta^3+\beta+1=0$. For convenience, $\beta, \beta^2, \beta^3, \beta^4, \beta^5, \beta^6$ and $\beta^7$ will first be determined, as follows.

$\beta=\beta$
$\beta^2=\beta^2$
$\beta^3=\beta+1$
$\beta^4=\beta^2+\beta$
$\beta^5=\beta^3+\beta^2=(\beta+1)+\beta^2=\beta^2+\beta+1$
$\beta^6=\beta^3+\beta^2+\beta=(\beta+1)+\beta^2+\beta=\beta^2+1$
$\beta^7=\beta^3+\beta=(\beta+1)+\beta=1$ When $\gamma=\beta^0=1$, $\sigma_1(1\cdot\beta^t)$ and $\sigma_2(1\cdot\beta^t)$ will be determined prior to determining $Q_1(t,x_1)=\sigma_2(1\cdot\beta^t)+x_1\sigma_1(1\cdot\beta^t)$.

$$\sigma_1(\beta^t) = \sum_{S=0}^{2}(\beta^t)^{2^S}$$

will be determined as follows:

for $t=0$, $$T(1) = \sum_{S=0}^{2} 1^{2^S} = 1+1+1 = 1$$

for $t=1$, $$T(\beta) = \sum_{S=0}^{2}\beta^{2^S} = \beta+\beta^2+\beta^4 = \beta+\beta^2+(\beta+\beta^2) = 0$$

for $t=2$, $$T(\beta^2) = \sum_{S=0}^{2}(\beta^2)^{2^S} = \beta^2+\beta^4+\beta^8 = \beta^2+\beta^4+\beta = 0$$

for $t=3$, $$T(\beta^3) = \sum_{S=0}^{2}(\beta^3)^{2^S} = \beta^3+\beta^6+\beta^{12} = \beta^3+\beta^6+\beta^5 = 1$$

for $t=4$, $$T(\beta^4) = \sum_{S=0}^{2}(\beta^4)^{2^S} = \beta^4+\beta^8+\beta^{16} = \beta^4+\beta+\beta^2 = 0$$

for $t=5$, $$T(\beta^5) = \sum_{S=0}^{2}(\beta^5)^{2^S} = \beta^5+\beta^{10}+\beta^{20} = \beta^5+\beta^3+\beta^6 = 1$$

for $t=6$, $$T(\beta^6) = \sum_{S=0}^{2}(\beta^6)^{2^S} = \beta^6+\beta^{12}+\beta^{24} = \beta^6+\beta^5+\beta^3 = 1$$

$$\sigma_2(\beta^t) = \sum_{S=0}^{(m-2)/2} T\gamma\left((\beta^t)^{1+2^S}\right)$$

for $t=0$, $\sigma_2(1) = \sum_{S=0}^{1} T\gamma(1^{1+2^S}) = T\gamma(1)+T\gamma(1) = 1+1 = 0$ for $t=1$, $\sigma_2(\beta) = \sum_{S=0}^{1} T\gamma(\beta^{1+2^S}) = T\gamma(\beta)+T\gamma(\beta^3) = 0+1 = 1$ for $t=2$, $\sigma_2(\beta^2) = \sum_{S=0}^{1} T\gamma((\beta^2)^{1+2^S}) = T\gamma(\beta^2)+T\gamma(\beta^6) = 0+1 = 1$ for $t=3$, $\sigma_2(\beta^3) = $ $$\sum_{S=0}^{1} T\gamma((\beta^3)^{1+2^S}) = T\gamma(\beta^3)+T\gamma(\beta^9) = T\gamma(\beta^3)+T\gamma(\beta^2) = 1+0 = 1$$

for $t=4$, $\sigma_2(\beta^4) = \sum_{S=0}^{1} T\gamma((\beta^4)^{1+2^S}) =$ $$T\gamma(\beta^4)+T\gamma(\beta^{12}) = T\gamma(\beta^4)+T\gamma(\beta^5) = 0+1 = 1$$

for $t=5$, $\sigma_2(\beta^5) = \sum_{S=0}^{1} T\gamma((\beta^5)^{1+2^S}) =$ $$T\gamma(\beta^5)+T\gamma(\beta^{15}) = T\gamma(\beta^5)+T\gamma(\beta) = 1+0 = 1$$

for $t=6$, $\sigma_2(\beta^6) = \sum_{S=0}^{1} T\gamma((\beta^6)^{1+2^S}) =$ $$T\gamma(\beta^6)+T\gamma(\beta^{18}) = T\gamma(\beta^6)+T\gamma(\beta^4) = 1+0 = 1$$

Therefore, when $\gamma=\beta^0=1$, the left sequence (for $x_1=0$) becomes $Q_1(t,0)=\sigma_2(\beta^t)=1001011$ and the right sequence (for $x_1=1$) becomes $Q_1(t,1)=\sigma_2(\beta^t)+\sigma_1(\beta^t)=1110100$.

In addition, when $\gamma=\beta^1=\beta$, $Q_\beta(t,x_1)=\sigma_2(\beta\cdot\beta^t)+x_1\sigma_1(\beta\cdot\beta^t)=\sigma_2(\beta^{t+1})+x_1\sigma_1(\beta^{t+1})=Q_1(t+1,x_1)$. Therefore, the sequence $Q_\beta(t,x_1)$ for $\gamma=\beta^1=\beta$ is equal to the result obtained by shifting once the sequence $Q_1(t,x_1)$ for $\gamma=\beta^0=1$.

In this manner, it is possible to determine the left sequence 1001011, the right sequence 1110100 and their shifted sequences. Herein, a sequence shifted i times will be referred to as $S_i$.

In step 513, an m-sequence is generated in accordance with the polynomial $f(x)=x^3+x+1$. Here, the m-sequence according to the polynomial $f(x)=x^3+x+1$ will become 1001011. A column permutation function for converting the m-sequence to a Walsh orthogonal code in accordance with Equation (8) is calculated using the m-sequence 1001011. Equation (8) implies that the m-sequence is converted into decimal numbers by grouping the m-sequence by three consecutive terms. That is, the first three terms 100 are converted to decimal number 4; the second three terms 001 are converted to decimal number 1; the third three terms 010 are converted to decimal number 2, the fourth three terms 101 are converted to decimal number 5; the fifth three terms 011 are converted to decimal number 3; the sixth three terms 111 are converted to decimal number 7; and the seventh three terms 110 are converted to decimal number 6. The foregoing results can be expressed as:

for $t = 0$, $\sigma(0) =$
$$\sum_{S=0}^{2} m(0+S)2^{2-S} = 4 \times m(0) + 2 \times m(1) + m(2) = (100)_2 = 4$$

for $t = 1$, $\sigma(1) =$
$$\sum_{S=0}^{2} m(1+S)2^{2-S} = 4 \times m(1) + 2 \times m(2) + m(3) = (001)_2 = 1$$

for $t = 2$, $\sigma(2) =$
$$\sum_{S=0}^{2} m(2+S)2^{2-S} = 4 \times m(2) + 2 \times m(3) + m(4) = (010)_2 = 2$$

for $t = 3$, $\sigma(3) =$
$$\sum_{S=0}^{2} m(3+S)2^{2-S} = 4 \times m(3) + 2 \times m(4) + m(5) = (101)_2 = 5$$

for $t = 4$, $\sigma(4) =$
$$\sum_{S=0}^{2} m(4+S)2^{2-S} = 4 \times m(4) + 2 \times m(5) + m(6) = (011)_2 = 3$$

for $t = 5$, $\sigma(5) =$
$$\sum_{S=0}^{2} m(5+S)2^{2-s} = 4 \times m(5) + 2 \times m(6) + m(7) = (111)_2 = 7$$

for $t = 6$, $\sigma(6) =$
$$\sum_{S=0}^{2} m(6+S)2^{2-S} = 4 \times m(6) + 2 \times m(7) + m(8) = (110)_2 = 6$$

The calculated column permutation functions are shown in Table 3A.

TABLE 3A

| t | Three Consecutive Terms | $\sigma(t)$ |
|---|---|---|
| 0 | 100 | 4 |
| 1 | 001 | 1 |
| 2 | 010 | 2 |
| 3 | 101 | 5 |
| 4 | 011 | 3 |
| 5 | 111 | 7 |
| 6 | 110 | 6 |

$\gamma = \beta^0 = 1$. That is, if $S_0(1)=1$, $S_0(2)=0$, $S_0(3)=0$, $S_0(4)=1$, $S_0(5)=0$, $S_0(6)=1$, $S_0(7)=1$, $S_0(8)=1$, $S_0(9)=1$, $S_0(10)=1$, $S_0(11)=0$, $S_0(12)=1$, $S_0(13)=0$ and $S_0(14)=0$ as determined in step 511, then $d_0(t)$ can be determined as follows:

$d_0(1)=0$
$d_0(2)=S_0(2-1)=S_0(1)=1$
$d_0(3)=S_0(3-1)=S_0(2)=0$
$d_0(4)=S_0(4-1)=S_0(3)=0$
$d_0(5)=S_0(5-1)=S_0(4)=1$
$d_0(6)=S_0(6-1)=S_0(5)=0$
$d_0(7)=S_0(7-1)=S_0(6)=1$
$d_0(8)=S_0(8-1)=S_0(7)=1$
$d_0(9)=0$
$d_0(10)=S_0(10-2)=S_0(8)=1$
$d_0(11)=S_0(11-2)=S_0(9)=1$
$d_0(12)=S_0(12-2)=S_0(12)=1$
$d_0(13)=S_0(13-2)=S_0(11)=1$
$d_0(14)=S_0(14-2)=S_0(12)=1$
$d_0(15)=S_0(15-2)=S_0(13)=1$
$d_0(16)=S_0(16-2)=S_0(14)=1$

In addition, when $i=1$, $d_0(t)$ is the binary sequence $S_1(t)$, at the head of which "0" is added, determined in step 511 for $\gamma = \beta^1 = \beta$. That is, when $S_1(1)=0$, $S_1(2)=0$, $S_1(3)=1$, $S_1(4)=0$, $S_1(5)=1$, $S_1(6)=1$, $S_1(7)=1$, $S_1(8)=1$, $S_1(9)=1$, $S_1(10)=0$, $S_1(11)=1$, $S_1(12)=0$, $S_1(13)=0$ and $S_1(14)=1$ as determined in step 511, $d_1(t)$ can be determined as follows.

$d_1(1)=0$
$d_1(2)=S_1(2-1)=S_1(1)=0$
$d_1(3)=S_1(3-1)=S_1(2)=0$
$d_1(4)=S_1(4-1)=S_1(3)=1$
$d_1(5)=S_1(5-1)=S_1(4)=0$
$d_1(6)=S_1(6-1)=S_1(5)=1$
$d_1(7)=S_1(7-1)=S_1(6)=1$
$d_1(8)=S_1(8-1)=S_1(7)=1$
$d_1(9)=0$
$d_1(10)=S_1(10-2)=S_1(8)=1$
$d_1(11)=S_1(11-2)=S_1(9)=1$
$d_1(12)=S_1(12-2)=S_1(10)=0$
$d_1(13)=S_1(13-2)=S_1(11)=1$
$d_1(14)=S_1(14-2)=S_1(12)=0$
$d_1(15)=S_1(15-2)=S_1(13)=0$
$d_1(16)=S_1(16-2)=S_1(14)=1$

Table 3B below shows the forgoing results, wherein $c_i$ ($i=0$ to 15) denotes an i-th column.

TABLE 3B

| $d_i(t)$ | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ |
|---|---|---|---|---|---|---|---|---|---|---|---|---|---|---|---|---|
| $d_1(t)$ | 0 | 1 | 0 | 0 | 1 | 0 | 1 | 1 | 0 | 1 | 1 | 1 | 0 | 1 | 0 | 0 |
| $d_2(t)$ | 0 | 0 | 0 | 1 | 0 | 1 | 1 | 1 | 0 | 1 | 1 | 0 | 1 | 0 | 0 | 1 |
| $d_3(t)$ | 0 | 0 | 1 | 0 | 1 | 1 | 1 | 0 | 1 | 0 | 1 | 0 | 0 | 1 | 1 | 1 |
| $d_4(t)$ | 0 | 1 | 0 | 1 | 1 | 1 | 0 | 0 | 0 | 0 | 1 | 0 | 0 | 1 | 1 | 1 |
| $d_5(t)$ | 0 | 0 | 1 | 1 | 1 | 0 | 0 | 1 | 0 | 1 | 0 | 0 | 1 | 1 | 1 | 0 |
| $d_6(t)$ | 0 | 1 | 1 | 1 | 0 | 0 | 1 | 0 | 0 | 0 | 0 | 1 | 1 | 1 | 0 | 1 |
| $d_7(t)$ | 0 | 1 | 1 | 0 | 0 | 1 | 0 | 1 | 0 | 0 | 1 | 1 | 1 | 0 | 1 | 0 |

In step 515, "0" is added at the head of every left sequence determined in step 511 and then arranged; succeedingly, "0" is added at the head of every right sequence and then arranged. With regard to the expression of $d_i(t)$ in accordance with $S_i(t)$, when $i=0$, $d_0(t)$ is the binary sequence $S_0(t)$, at the head of which "0" is added, determined in step 511 for In step 517, the shifted arranged specific sequences of Table 3B are column permutated with the column permutation functions determined in step 513. Shown in Table 3C below are the binary sequences of Table 3B which are column permuted with the column permutation function determined in step 513.

TABLE 3C

| $e_i(t)$ | $c_0$ | $c_4$ | $c_1$ | $c_2$ | $c_5$ | $c_3$ | $c_7$ | $c_6$ | $c_8$ | $c_{12}$ | $c_9$ | $c_{10}$ | $c_{13}$ | $c_{11}$ | $c_{15}$ | $c_{14}$ |
|---|---|---|---|---|---|---|---|---|---|---|---|---|---|---|---|---|
| $e_0(t)$ | 0 | 1 | 1 | 0 | 0 | 0 | 1 | 1 | 0 | 0 | 1 | 1 | 1 | 1 | 0 | 0 |
| $e_1(t)$ | 0 | 0 | 0 | 0 | 1 | 1 | 1 | 1 | 0 | 1 | 1 | 1 | 0 | 0 | 1 | 0 |
| $e_2(t)$ | 0 | 1 | 0 | 1 | 1 | 0 | 0 | 1 | 0 | 0 | 1 | 0 | 0 | 1 | 1 | 1 |
| $e_3(t)$ | 0 | 1 | 1 | 0 | 1 | 1 | 0 | 0 | 0 | 0 | 0 | 1 | 1 | 0 | 1 | 1 |
| $e_4(t)$ | 0 | 1 | 0 | 1 | 0 | 1 | 1 | 0 | 0 | 1 | 1 | 0 | 1 | 0 | 0 | 1 |
| $e_5(t)$ | 0 | 0 | 1 | 1 | 0 | 1 | 0 | 1 | 0 | 1 | 0 | 0 | 1 | 1 | 1 | 0 |
| $e_6(t)$ | 0 | 0 | 1 | 1 | 1 | 0 | 1 | 0 | 0 | 1 | 0 | 1 | 0 | 1 | 0 | 1 |

By connecting the above left and right sequences of length 8, it is possible to create binary quasi-orthogonal code mask candidates of length 16 shown in Table 3D.

TABLE 3D $e_0(t)$ : 0 1 1 0 0 0 1 1 0 0 1 1 1 1 0 0
$e_1(t)$ : 0 0 0 0 1 1 1 1 0 1 1 1 0 0 1 0
$e_2(t)$ : 0 1 0 1 1 0 0 1 0 0 1 0 0 1 1 1
$e_3(t)$ : 0 1 1 0 1 1 0 0 0 0 0 1 1 0 1 1
$e_4(t)$ : 0 1 0 1 0 1 1 0 0 1 1 0 1 0 0 1
$e_5(t)$ : 0 0 1 1 0 1 0 1 0 1 0 0 1 1 1 0
$e_6(t)$ : 0 0 1 1 1 0 1 0 0 1 0 1 0 1 0 1

In summary, the left and right binary sequences are independently column shifted and arranged. Then, "0" is added to every left and right sequence to crease left and right sequences of length 8. Thereafter, the left and right sequences are column permuted according to the column permutation function, respectively. The column permuted left and right sequences are connected to crease quasi-orthogonal code mask candidate functions of length 16.

Alternatively, after column shifting the left and right binary sequences, arranging the column shifted sequences and then column permuting the arranged left and right sequences according to the column permutation function, "0" can be added at the head of the column shifted left and right sequences to generate the left and right sequences of length 8.

The created binary quasi-orthogonal code mask candidates are added to Walsh orthogonal codes to verify whether Condition 3 is satisfied.

Thereafter, in step 519, sequences satisfying Condition 3 are selected from the $(2^{m-1}-1)*2^m$ quasi-orthogonal code candidates, and the used quasi-orthogonal code mask candidate is selected as a quasi-orthogonal code mask. That is, after the process of step 517, in step 519, sequences satisfying Condition 3, are selected from the determined mask candidate families. With regard to the selecting method, every Walsh orthogonal code and a correlation for every length are determined to examine whether Condition 3 is satisfied, and accordingly selected as a mask when condition 3 is satisfied.

For example, for an orthogonal code of length 128, a partial correlation with every Walsh orthogonal code of length 64 is determined to examine whether the partial correlation exceeds 8. When the partial correlation exceeds 8, it is not selected as a mask; otherwise, when satisfied, a partial correlation is calculated again for partial length 32 with respect to the mask candidate. Then, it is examined whether the partial correlation value exceeds 8. When the partial correlation exceeds 8, it is not selected as a mask; otherwise, when satisfied, the same operation is performed for the next length. After performing the above process for the partial length of up to 4, a mask candidate having passed all of the above conditions is selected as a quasi-orthogonal code mask candidate satisfying Conditions 1 to 3.

Quasi-orthogonal code sequences generated using the process of FIG. 5 are determined by the mask function $e_i(t)$. That is, when the mask function $e_i(t)$ satisfy Conditions 1 to 3, it is, possible to obtain $2^m$ quasi-orthogonal codes. Therefore, if k masks satisfying Conditions 1 to 3 exist, it is possible to obtain $k \times 2^m$ quasi-orthogonal codes. Table 4 below shows the number of quasi-orthogonal codes according to the m-sequence. Further, Tables 5, 6 and 7 below show the quasi-orthogonal code sequence mask functions $e_i(t)$ for m=6, m=7 and m=8, respectively, determined in the above process.

TABLE 4

| m | characteristic polynomial | # of Quasi-orthogonal sequences |
|---|---|---|
| 6 | 100101 | 8 * 64 |
| 7 | 10000011 | 22 * 128 |
| 8 | 10001001 | 20 * 256 |

TABLE 5 f(X) = 1 + X + $X^5$ (Binary Expression)

e1 : 00010100001001110100000110001101001001110001010001110010101111110
e2 : 0001001000011010111010001111011010010001011100011010001001000001
e3 : 0001010000011011000101001100010011111011000110110000101010001101
e4 : 0001001001000111010001110001001001110100001000011101111010001011
e5 : 0001000100011100010001000101010111011011010111100000100010001011
e6 : 00010111010000100111111100010101011111111011010100000101111101111101
e7 : 00010100011100100010011101000001001010000101100011110010001111101
e8 : 0001011101111110011100011110011100100100010011011011110100101011

TABLE 6 f(X) = 1 + X + $X^7$ (Hexadecimal Expression)

e1 : 17422b8118b2db8e2b7ee842248e184d
e2 : 177e2b427e17bdd47ee8bd2be87ed442

TABLE 6-continued f(X) = 1 + X + X$^7$ (Hexadecimal Expression)

e3 : 144e4eeb7dd8277d4eeb144ed8828227
e4 : 111e2ddd1eeeddd2444b78884bbb8887
e5 : 171871814d422bdb4d422bdbe8e78e7e
e6 : 121d47b7121db8481ded4847e2124847
e7 : 17182bdb2b24e8187e7142b2bdb27e8e
e8 : 142741724172ebd872412714d8eb7241
e9 : 114b228744e1772d2d771ebb8722b4ee
e10 : 1178771e2dbb4bdd77e1ee784b22d2bb
e11 : 112d784477b4e1221edd884b87bbeed2
e12 : 11782d444bdd881e44d287111e77224b
e13 : 172471422be74d8118d47eb224174271
e14 : 147214727d1b82e4284e284e4127bed8
e15 : 122e122e7b4784b8477bb8842e122e12
e16 : 121d1ded747b7b8b2ede212eb747b8b7
e17 : 141b41b127d78d8227d7727d141bbe4e
e18 : 122e48741d21477b7448d1ed7b47dee2
e19 : 141b1beb41b14e4114e41b14414e4ebe
e20 : 1274127448d1b72e12741274b72e48d1
e21 : 111e778778881e11777811e11eee7877
e22 : 14724e281b7d41271b7d412714724e28

TABLE 7 f(X) = 1 + X$^3$ + X$^7$ (Hexadecimal Expression)

e1 : 112d77b4447822e11e2278bbb488d211112d77b4447822e1e1dd87444b772dee
e2 : 121d47487484de2e21d18b7bb8b7ede27b8b2edee2ed48474847e2ed2ede7b8b
e3 : 171824d44d427e8e717e42b22b2418e84d427e8e171824d4d4dbe7178e81bd4d
e4 : 127448d121b87b1d48d1ed8b84e221b81274b72ede477b1d48d112747b1d21b8
e5 : 1247217448e27bd112bBde74b7e27b2e1db72e84b8ed8bdee2b72e7bb81274de
e6 : 142714d87db182b127ebd8eb4e7d4e8272be7241e4d71bd74172be72d71bd7e4
e7 : 141b7d8d727d1beb7d8d141be4148d8227d74e4141b12827b1bed828282741b1
e8 : 117878112d44bbd22dbbbb2d118778ee442d2d4487ee11788711118744d22dbb
e9 : 147227417de4b1282741eb8db128821b28b11b82bed87214e47d28b18debbed8
e10 : 141b4e41414ee4eb28278d827d7227284ebeeb1be414be4e728228d8d8287d8d
e11 : 144e4eeb1bbebee4144e4eebe441411b7228d7728227d8828dd7288d8227d882
e12 : 112d1e224b88bb784b88bb78eed2e1dd784488b422e12deedd1ed211784488b4
e13 : 1274482e47211d7b7412d1b7deb87b1d7b1d2147d1b78bed1d7bb8de482eed8b
e14 : 17242b1871424d7e71bd4d8117db2be72be717db4d8171bdb2818ebdd4e7e8db
e15 : 144e288d277de4412782e4beeb4ed78d4e1472d782d841e48227411bb1148dd7
e16 : 111e11e122d2ddd24bbb4b44787787771eeee1ee2d222ddd444bbb4b77877778
e17 : 127447211274b8de1d7bb7d1e284b7d1128bb821ed74b8211d8448d11d84b72e
e18 : 112d774b1edd78bb78bbe122774beed2448722e1b488d2eed2ee4b7722e1bb78
e19 : 177e7ee8422b2bbd7e17e87e2b42bd2b244d4ddb8ee7e771b2db24b218718e18
e20 : 111e222d444b7778111e222d444b77781e112d224b447877e1eed2ddb4bb8788

Therefore, when an increased number of orthogonal codes are required in a system using Walsh orthogonal codes, it is possible to increase channel capacity, by using the quasi-orthogonal codes generated according to the present invention. In such a case, the quasi-orthogonal codes have limited interference with the Walsh orthogonal codes and provide a fixed correlation value. For example, when N=64, a correlation value between the quasi-orthogonal code and the Walsh orthogonal code is 8 or −8. Further, even when N=256, a partial correlation value (for length N=64) is also 8 or −8. This means that it is possible to accurately predict the interference, providing excellent characteristics.

The above quasi-orthogonal codes can be used for every link in the CDMA system using the Walsh orthogonal codes. When the quasi-orthogonal codes are used together with the orthogonal codes, the following three options can be considered.

Option 1

In a system using the Walsh orthogonal codes and providing a service at a variable data rate, it is possible to freely use the binary quasi-orthogonal codes without restriction as to the length. Further, it is possible to use every binary quasi-orthogonal code sequence at full length.

Option 2

One Walsh orthogonal code group and a binary quasi-orthogonal code group is selected to make two orthogonal sets, and the two groups both can provide a service at the variable data rate.

Option 3

It is possible to use the Walsh orthogonal code group and every binary quasi-orthogonal code group as one group to allow every code group to support the variable data rate. In this case, a random code characteristic between the binary quasi-orthogonal code groups may occur.

It is preferable to use the quasi-orthogonal codes according to the application, taking into consideration the above three options. In general, when only the Walsh orthogonal codes are used, the modulating side exchanges a predetermined orthogonal code number with the demodulating side. Therefore, when the orthogonal codes and the quasi-orthogonal codes are used, it is necessary to exchange a predetermined orthogonal code number and a group number (i.e., an index i of the Q' matrix $e_i(t)$ shown in FIG. 4). In this case, the orthogonal code group is defined as a Group 0, and subsequently, the group numbers are redefined up to $2^m-1$.

A description will now be made regarding a method for applying the quasi-orthogonal code group to a system supporting the variable data rate, like the orthogonal code group. Each element of the quasi-orthogonal code group is comprised of an orthogonal code number and a group number. The group number indicates which $e_i(t)$ is selected in FIG. 4. To service the variable data rate using the quasi-orthogonal code group, a previously allocated orthogonal code number is used as a Walsh orthogonal code number and then, the allocated $e_i(t)$ is added to it for every length N.

Figure 6:
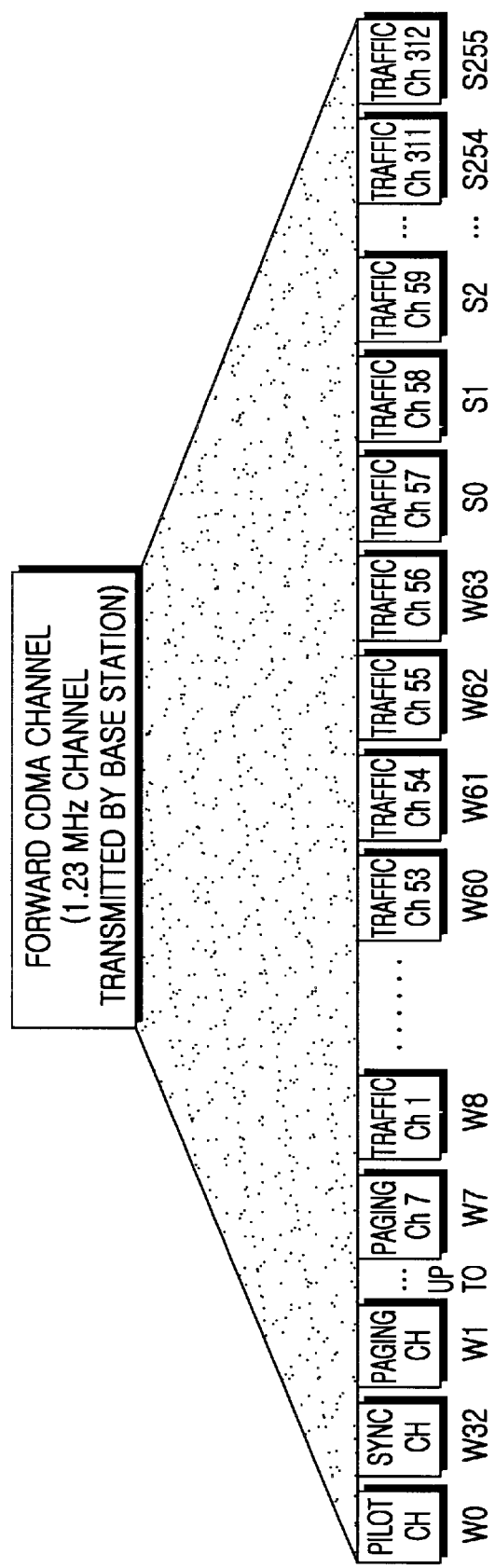
FIG. 6 is a diagram illustrating channel separation using Walsh orthogonal codes and quasi-orthogonal codes generated according to an embodiment of the present invention, in a CDMA communication system.

FIG. 6 illustrates a channel separation method using the Walsh orthogonal codes and the quasi-orthogonal codes in an IS-95/IS-95A forward link to extend the channel capacity according to an embodiment of the present invention. FIG. 6 shows an exemplary embodiment where the Walsh orthogonal codes represented by Wi (i=0 to 63) are assigned to various channels and the quasi-orthogonal codes of length 256 represented by Sj (j=0 to 255) are assigned to traffic channels. Therefore, an IS-95/IS-95A forward link can separate 64 channels using the Walsh orthogonal codes, and 256 channels, which is 4 times the number of the Walsh orthogonal codes, using the quasi-orthogonal codes. Therefore, it is possible to increase the channel capacity by using the Walsh orthogonal codes and the quasi-orthogonal codes.

Figure 7:
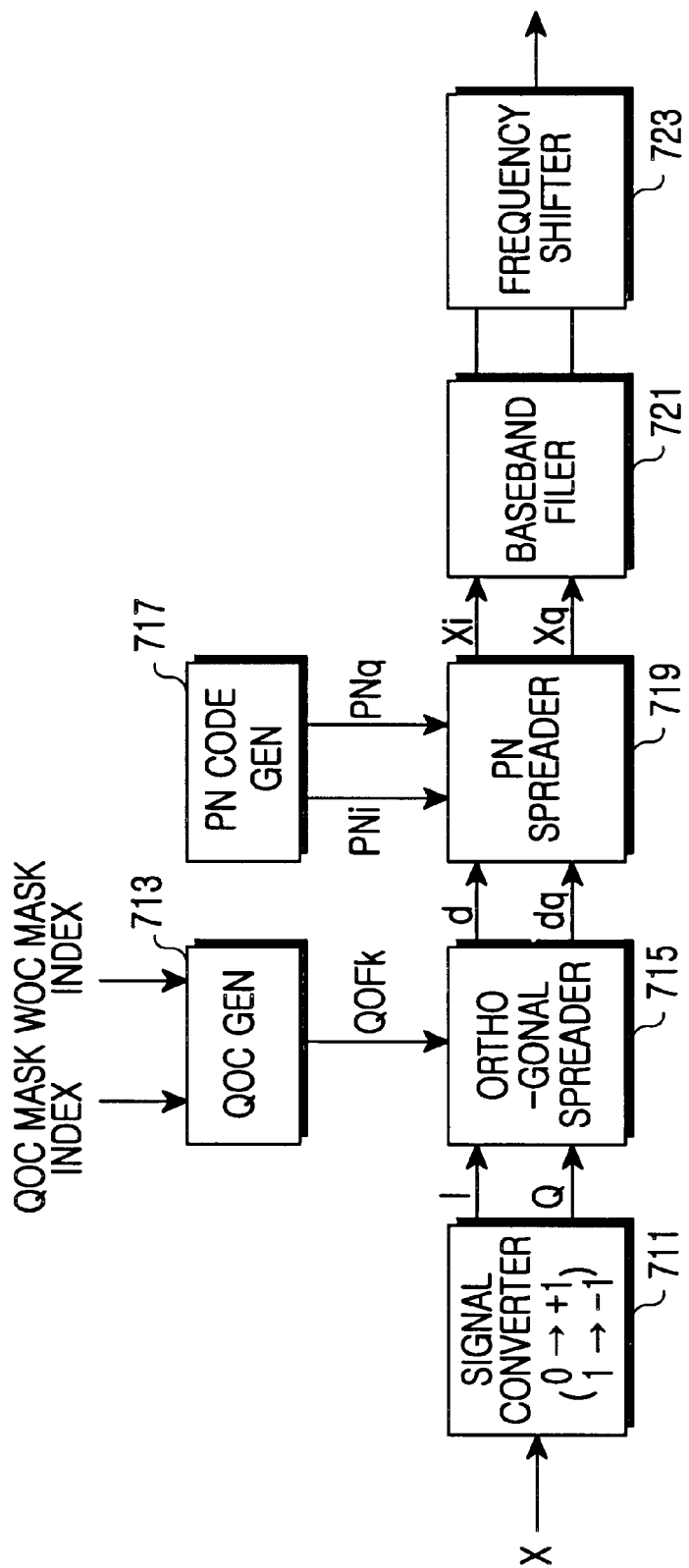
FIG. 7 is a bock diagram illustrating a channel transmitter using quasi-orthogonal codes generated according to an embodiment of the present invention, in a CDMA communication system.

FIG. 7 illustrates a channel transmitter which separates channels using the quasi-orthogonal codes generated according to the present invention. The mobile communication system shown in FIG. 7 constructs the channel bit streams in a method different from the IS-95 standard.

Referring to FIG. 7, a signal converter (or demultiplexing & signal mapping part) 711 receiving a data bit stream X, separates the received data bit stream into odd-numbered bits and even-numbered bits to demultiplex the separated signals into I and Q signals, and then converts the separated I and Q signals by converting a signal "0" to "+1" and a signal "1" to "−1". A quasi-orthogonal code (QOC) generator 713, receiving quasi-orthogonal code mask index and a Walsh orthogonal code (WOC) mask index, generates a quasi-orthogonal code QOFk. An orthogonal spreader 715 channel spreads the signals output from the signal converter 711 with the quasi-orthogonal code QOFk generated from the quasi-orthogonal code generator 713. A PN code generator 717 generates complex PN codes PNi and PNq. A PN spreader 719 PN masks the orthogonally spread signals di and dq with PNi and PNq, respectively. A baseband filter 721 filters the PN spread signals Xi and Xq into baseband signals. A frequency shifter 723 up-converts the baseband filtered signals Xi and Xq to RF signals.

Although FIG. 7 illustrates one channel transmitter using the quasi-orthogonal code in a CDMA communication system, when the transmitter includes N channels, the corresponding number of orthogonal spreaders should be provided which use the quasi-orthogonal codes.

Referring to FIG. 7, binary input signals expressed as "0" and "1" are demultiplexed into I and Q signals by the signal converter 711, and then converted in a such manner that a signal "0" is converted to "+1" and a signal "1" to "−1". The quasi-orthogonal code generator 713 then generates a quasi-orthogonal code QOFk according to the received quasi-orthogonal code mask index and Walsh orthogonal code mask index. The orthogonal spreader 715 multiplies the signals output from the signal converter 711 by the quasi-orthogonal code QOFk to spread a transmission signal on the corresponding channel.

The quasi-orthogonal code generator 713 can be implemented using two different methods.

Using a first method, the quasi-orthogonal code generator 713 includes a memory shown in FIG. 11 to generate the quasi-orthogonal codes. That is, every quasi-orthogonal sequence is stored in the memory as shown in FIG. 11 to output the quasi-orthogonal sequence according to the quasi-orthogonal code mask index and the Walsh orthogonal code index. Further, the quasi-orthogonal code generator 713 stores all the available quasi-orthogonal sequences in the memory, and upon receipt of a quasi-orthogonal code index q and an orthogonal code index p, outputs $(q*2^m+p)$-th quasi-orthogonal sequence $QOF_{q \times 2^m+p}$. In FIG. 11, upper $2^m$ sequences are Walsh orthogonal code sequences, and the other sequences are quasi-orthogonal code sequences.

In a second method, the quasi-orthogonal code generator 713 is implemented as shown in FIG. 8.

Figure 10:
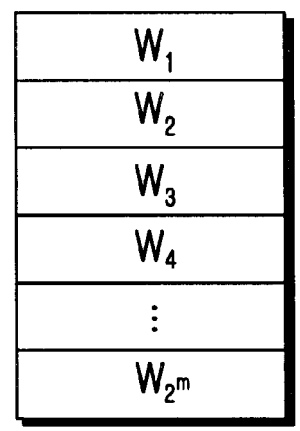
FIG. 10 is a diagram illustrating a Walsh orthogonal code table in the quasi-orthogonal code generator of FIG. 8 according to an embodiment of the present invention, by way of example.

Referring to FIG. 8, a quasi-orthogonal code mask generator 811 storing quasi-orthogonal code masks $e_0$-$e_N$, outputs a quasi-orthogonal code mask $e_i$ according to a received quasi-orthogonal code mask index. That is, the quasi-orthogonal code mask generator 811 includes a table for quasi-orthogonal code masks $e_i$, which can be implemented as shown in FIG. 9. Referring to FIG. 9, since $e_0=0$, when $e_0$ is selected, a Walsh orthogonal code is output which is generated from a Walsh orthogonal code generator 813. The Walsh orthogonal code generator 813 storing Walsh orthogonal codes, outputs a Walsh orthogonal code $W_j$ according to a received Walsh orthogonal code index. The Walsh orthogonal code generator 813 includes a Walsh orthogonal code table, which can be implemented as shown in FIG. 10. An adder 815 adds the quasi-orthogonal code mask $e_i$ output from the quasi-orthogonal code mask generator 811 and the Walsh orthogonal code $W_j$ output from the Walsh orthogonal code generator 813 to generate a quasi-orthogonal code QOFk.

A signal spread with the quasi-orthogonal code is applied to the PN spreader 719. The PN spreader 719 then spreads the signals di and dq output from the orthogonal spreader 715 with corresponding PN codes PNi and PNq, thereby performing PN masking. The PN masked signals Xi and Xq are baseband filtered by the baseband filter 721, and the baseband filtered signals are converted to RF signals by the frequency shifter 723.

FIG. 12 illustrates a channel transmitter which uses a Walsh orthogonal code and a quasi-orthogonal code according to an embodiment of the present invention, in a CDMA communication system. FIG. 12 shows an example in which when transmitting at least two transmission signals, the transmission signals of the respective channel transmitters are spread with unique quasi-orthogonal codes or unique Walsh orthogonal codes. In FIG. 12, a first channel signal and a second channel signal can be signals on dedicated channels, or signals on a dedicated channel and a common channel. The dedicated channel includes a fundamental channel, a supplemental channel and a dedicated control channel, and the common channel includes a common control channel, a pilot channel, a sync channel and a paging channel. In the embodiment, the common channels use Walsh orthogonal codes, and the dedicated channels use either the Walsh orthogonal codes or the quasi-orthogonal codes.

Referring to FIG. 12, a first signal converter 1211. demultiplexes a received first channel beat stream to I and Q arms, and then converts the demultiplexed signals. That is, the first signal converter 1211 converts a signal "0" of the received first channel bit stream to "+1" and a signal "1" to "−1", and provides the converted signals to an orthogonal code spreading and PN masking part 1219. Similarly, a second signal converter 1213 demultiplexes a received second channel bit stream to I and Q arms, and then converts the demultiplexed signals. The second signal converter 1213 converts a signal "0" of the received second channel bit stream to "+1" and a signal "1" to "−1", and provides the converted signals to the orthogonal code spreading and PN masking part 1219.

An orthogonal code generator 1215 receiving a quasi-orthogonal code (QOC) mask index and a Walsh orthogonal code (WOC) index, generates a Walsh orthogonal code $W_j$ or a quasi-orthogonal code $S_i$ using the received indexes and provides the generated code to the orthogonal code spreading and PN masking part 1219. Here, the number of orthogonal code generators 1215 should equal the number of the channel transmitters. For example, in FIG. 12, to separately provide orthogonal codes for the first channel and the second channel, there are required two orthogonal code generators. In addition, the orthogonal code generator 1215 should be able to generate quasi-orthogonal codes and Walsh orthogonal codes according to the quasi-orthogonal code mask index and the Walsh orthogonal code index designated by an upper processor, as shown in FIG. 8.

A PN code generator 1217 generates real and imaginary PN codes PNi and PNq and provides them to the orthogonal code spreading and PN masking part 1219. The orthogonal code spreading and PN masking part 1219 multiplies outputs of the first and second signal converters 1211 and 1213 by associated unique Walsh orthogonal codes $W_j$ or quasi-orthogonal codes $S_i$ to spread the input signals, and again multiplies the spread signals by the PN codes PNi and PNq to generate PN masked signals Xi and Xq. A baseband filter 1221 filters the signals Xi and Xq output from the orthogonal code spreading and PN masking part 1219 to baseband signals. A frequency shifter 1223 frequency-shifts the signals output from the baseband filter 1221 to RF signals.

To ensure a high correlation property for multipath delay, the orthogonal code spreading and PN masking part 1219 can be implemented in various configurations. FIG. 13 illustrates an orthogonal code spreading and PN masking part implemented by a complex multiplier 1319 for complex PN masking, which uses a quasi-orthogonal code $S_i$ for the first channel and a Walsh orthogonal code $W_i$ for the second channel. In addition, the complex multiplier 1319 can also be equally applied to the case where the quasi-orthogonal codes $S_i$ are used for both the first and second channels to perform complex PN masking. FIG. 14 illustrates an orthogonal code spreading and PN masking part, which employs non-complex PN masking and uses a Walsh orthogonal code $W_i$ for the first channel and a quasi-orthogonal code $S_i$ for the second channel. In addition, the same scheme can also be equally applied to the case where the quasi-orthogonal codes $S_i$ are used for both the first and second channels and complex PN masking is not employed. In FIGS. 13 and 14, the number of channel spreaders and orthogonal code generators provided as equal the number of channels. Further in FIG. 13, there is required only one complex multiplier.

Referring to FIG. 13, a first spreader 1311 receiving a first channel signal, multiplies the received first channel signal by a quasi-orthogonal code $S_i$ to output spread signals di1 and dq1. A second spreader 1313 receiving a second channel signal, multiplies the received second channel signal by a Walsh orthogonal code $W_i$ to output spread signals di2 and dq2. A repeater 1317 repeats the PN codes PNi and PNq output from the PN code generator 1217 at predetermined times. The complex multiplier 1319 adds the signal di1 to the signal di2 and the signal dq1 to dq2, output from the first and second spreaders 1311 and 1313; and complex multiplies the added signals di1+di2 and dq1+dq2 by the PN codes PNi and PNq output from the repeater 1317, respectively, to generate PN masked signals Xi and Xq. The complex multiplier 1319 performs complex PN masking by performing the complex operation shown in FIG. 13.

In FIG. 13, with regard to the quasi-orthogonal code $S_i$ and the Walsh orthogonal code $W_i$ assigned to the first and second channels, sub-codes constituting the orthogonal codes should also be different from each other. Therefore, in the case where the orthogonal code spreading and PN masking part 1219 is implemented in this manner, it is possible to acquire accurate arrival time synchronization between the first channel and the second channel, thereby removing mutual interference between them.

FIG. 14 illustrates the orthogonal code spreading and PN masking part 1219, wherein the Walsh orthogonal code $W_i$ is used for the first channel and the quasi-orthogonal code $S_i$ is used for the second channel, and non-complex PN masking is employed.

Referring to FIG. 14, a first spreader 1411 receiving a first channel signal, multiplies the received first channel signal by a Walsh orthogonal code $W_i$ to output spread signals di1 and dq1. Similarly, a second spreader 1413 receiving a second channel signal, multiplies the received second channel signal by a quasi-orthogonal signal $S_i$ to output spread signals di2 and dq2. An adder 1415 adds the spread signal di1 output from the first spreader 1411 to the spread signal di2 output from the second spreader 1413 to generate a signal di1+di2. An adder 1417 adds the spread signal dq1 output from the first spreader 1411 to the spread signal dq2 output from the second spreader 1413 to generate a signal dq1+dq2. A repeater 1421 repeats the PN codes PNi and PNq output from the PN code generator 1217 at predetermined times. A multiplier 1423 multiplies the spread signal di1+di2 output from the adder 1415 by the PN code PNi output from the repeater 1421 to generate a masked signal Xi. A multiplier 1425 multiplies the spread signal dq1+dq2 output from the adder 1417 by the PN code PNq to generate a masked signal Xq.

In FIG. 14, as stated above, the Walsh orthogonal code $W_i$ assigned to the first channel should be different from the quasi-orthogonal code $S_i$ assigned to the second channel. In the case where the orthogonal code spreading and PN masking part 1219 is implemented in this manner, it is possible to acquire accurate arrival time synchronization between the first channel and the second channel, thereby removing mutual interference between them.

As described above, the embodiment can generate quasi-orthogonal codes having the least interference with Walsh orthogonal codes. Further, in a mobile communication system which separates channels using the Walsh orthogonal codes, it is possible to increase channel capacity by using the quasi-orthogonal codes regardless of the limitation on the Walsh orthogonal codes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a binary quasi-orthogonal code in a code division multiple access (CDMA) communication system, comprising the steps of:

(a) generating an m-sequence, and specific left and right sequences having a full correlation property which have a specific bound of correlation value with the m-sequence;

(b) column permuting the specific left and right sequences in a column permutation method used when converting the m-sequence to a Walsh orthogonal code respectively, and connecting the left sequences to the right sequences to generate mask candidates;

(c) operating the mask candidates and the Walsh orthogonal codes having the same length as the mask candidates to generate quasi-orthogonal code candidate families; and (d) selecting a quasi-orthogonal code out of the generated quasi-orthogonal code candidate families, wherein the selected quasi-orthogonal code satisfies a partial correlation property with the Walsh orthogonal codes, and selecting a mask corresponding to generation of the selected quasi-orthogonal code.

2. The method as claimed in claim 1, wherein the specific left and right sequences are Kerdock codes of a Family A sequence, for generating binary quasi-orthogonal code masks.

3. The method as claimed in claim 2, wherein said step (b) comprises the steps of:

(1) independently shifting the specific left and right sequences, to generate shifted left and right sequences;

(2) independently column permuting the specific left and right sequences and the shifted left and right sequences with a column permutation function; and (3) connecting the column permuted left sequences to the column permuted right sequences to generate binary quasi-orthogonal code mask candidates.

4. The method as claimed in claim 3, wherein said step (1) comprises the step of inserting "0" at the head of the shifted left and right sequences.

5. The method as claimed in claim 2, wherein a mask for generating the binary quasi-orthogonal code is selected as a binary quasi-orthogonal code mask when a correlation value of each part of N/M does not exceed $\sqrt{N/M}$, where N is the whole length of the binary quasi-orthogonal code candidate and the Walsh orthogonal code, $M=2^m$, and $m=0,1,\ldots,\log_2 N$, in the step (d).

6. The method as claimed in claim 5, further comprising the step of storing a mask for generating the binary quasi-orthogonal code as the binary quasi-orthogonal code mask when a correlation value of each part of N/M does not exceed $\sqrt{N/M}$, where N is the whole length of a binary quasi-orthogonal code candidate generated with the mask and another binary quasi-orthogonal code candidate, $M=2^m$, and $m=0,1,\ldots,\log_2 N$.

7. A channel transmission device for a CDMA communication system, comprising:

a generator for generating a binary quasi-orthogonal code by operating a binary quasi-orthogonal code mask and a Walsh orthogonal code corresponding to designated mask index and Walsh orthogonal code index, respectively;

a channel spreader for operating input signals and the generated binary quasi-orthogonal codes to generate channel spread signals; and a PN (Pseudo Noise) masking part for operating the channel spread signals and PN sequences to generate PN masked channel signals.

8. The channel transmission device as claimed in claim 7, wherein the binary quasi-orthogonal code generator comprises:

a first generator for generating the binary quasi-orthogonal code mask corresponding to the designated mask index;

a second generator for generating the Walsh orthogonal code corresponding to the designated Walsh orthogonal code; and an adder for operating the binary quasi-orthogonal code mask and the Walsh orthogonal code to generate a binary quasi-orthogonal code.

9. A channel transmission method for a CDMA communication system, comprising the steps of:

generating a binary quasi-orthogonal code mask corresponding to a designated quasi-orthogonal code index, and generating a binary quasi-orthogonal code by operating the generated binary quasi-orthogonal code mask and a Walsh orthogonal code;

operating input signals and the generated binary quasi-orthogonal codes to generate channel spread signals; and operating the channel spread signals and complex PN sequences to generate PN masked channel signals.

* * * * *